United States Patent Office 3,677,692
Patented July 18, 1972

3,677,692
HIGH ENERGY RADIATION STABILIZATION OF CELLULOSE OBTAINED BY ESTERIFYING WITH FUROYL CHLORIDE
Jett C. Arthur, Jr., Metairie, La., Sujan Singh, Banaras, Uttar Pradesh, India, and Oscar Hinojosa, Metairie, La., assignors to the United States of America as represented by the Secretary of Agriculture
No Drawing. Filed Apr. 30, 1971, Ser. No. 139,137
Int. Cl. D06m 13/20
U.S. Cl. 8—120                                    9 Claims

ABSTRACT OF THE DISCLOSURE

This invention relates to a method for stabilizing organic materials that contain the glycosidic bond to the effects of high energy radiation. Stabilization is achieved by the introduction of furoate groups as substituents into the said organic material. The method of this invention has as its objective the modification of the chemical structure of organic materials which contain the glycosidic bond to allow preferential transfer of high energy from one part of the organic material to the furoate substituent group within which group radiation energy is dissipated without damage to the glycosidic bond of the organic material.

---

A non-exclusive, irrevocable, royalty-free license in the invention herein described, throughout the world for all purposes of the United States Government, with the power to grant sublicenses for such purposes, is hereby granted to the Government of the United States of America.

This instant invention relates to a process for the preparation of cotton textile products, wherein the macromolecular and morphological properties of cotton are selectivity and permanently stabilized to the degradative effects of high energy radiation, so that said textile products could be used in manufacturing processes in which high energy radiation is employed in one of the unit operations such as in sterilization and copolymerization processes. The method of this invention has as its objective the modification of the chemical structure of cotton fibers, mechanically organized into textile products so that the natural properties of cotton are conserved to a maximum extent while imparting high energy radiation resistance and stabilization to the resulting all cotton textile products.

Developments in the commercial use of high energy radiation, for example, in sterilization of medical and personal products, preparation of copolymers of wood block flooring, curing of coatings, and durable-press textile processing, are currently of great interest. Since cellulose is by far the most widely used polymer in most of these commercial applications, the effects of high energy radiation on the macromolecular properties of cellulose are of prime interest. Cellulose belongs to that class of polymers, which on exposure to high energy radiation, oxidatively depolymerizes by cleavage of the glycosidic bond.

High energy radiation, which interacts in a chemically non-specific manner with compounds containing elements of low atomic number, such as cellulose, ionizes the compound. That is, a spur of secondary electrons is formed. The localization of energy from these secondary electrons initiates practically all of the observable chemical effects of radiation on compounds. If the energy from these secondary electrons could be selectively absorbed and dissipated as heat or light, the localization of energy that initiates glycosidic bond clevage would be eliminated or at least minimized. Therefore, cellulose could be stabilized or made resistant to the degradative effects of high energy radiation. We have previously shown (U.S. Pat. 3,519,382) that the introduction of aromatic groups as substitutents on the cellulose molecule stabilized the cellulosic polymer to the degradative effects of high energy radiation.

The instant invention defines another class of substituent groups, which when introduced into cellulose, stabilize cellulose to the degradative effects of high energy radiation. Whereas aromatic groups are cyclic compounds containing six carbon atoms, furoate groups are heterocyclic compounds containing four carbon atoms and one oxygen atom. Unexpectedly it was found that when furoate groups were introduced as substituents on cotton cellulose, these groups selectively absorbed and dissipated the energy from the secondary electrons, thereby minimizing glycosidic bond cleavage and stabilizing cotton to high energy radiation. In the case of aromatic groups, we found that some types of covalent linkages bonding the groups to cellulose were not stable to high energy radiation; in such cases when the covalent bonds were broken, the radiation stabilization effects of aromatic groups on cellulose were lost. In the case of furoate groups evaluated, the covalent bonds between the furoate groups and cellulose were apparently stable to high energy radiation; therefore, the radiation stabilization effects on cellulose of all of furoate groups evaluated were retained on exposure to high energy radiation.

The following examples set forth the invention in more detail.

EXAMPLE 1

Purified fibrous cotton (8 parts) in the form of 7s/3 yarn (a convenient textile product for handling and testing), which had been dried in air for 60° C. for 2 hours, was placed in a reaction flask with N,N-dimethylformamide (200 parts). Then furoyl chloride and pyridine were added to the content of the reaction flask and stirred and heated at 85° C. for the desired reaction time. Then the yarn products were washed twice with N,N-dimethylformamide solvent (100 parts); immersed in methanol (100 parts) ot 60° C. for 30 minutes; then treated with potassium bicarbonate solution (10 percent concentration) at 25° C. for 30 minutes; followed by washing with water. The yarn products were stretched overnight to about 75 percent of their original lengths and then dried at 25° C. and 50 percent relative humidity for 24 hours. Concentrations in the reaction mixture of cotton to 2-furoyl chloride to pyridine (1 mole of D-glucose residue of cotton to 4 moles of 2-furoyl chloride to 8 moles of pyridine) after 6 hours of reaction time gave a furoated yarn product with a degree of substitution of 1.26 furoate groups per glucose residue of cotton. The initial strength of the furoated cotton yarn product was 11.6 pounds; after exposure to gamma radiation from cobalt-60 (a convenient source of high energy radiation) in air to a dosage of $1.1 \times 10^{21}$ e.v./g., the strength of the irradiated, furoated cotton yarn was 7.4 pounds. Untreated cotton yarn had a strength of 10.5 pounds; after irradiation to the same dosage the strength of irradiated, untreated yarn was 2.5 pounds. Protection from radiation damage is indicated by the facts (1) that the furoated cotton yarn (degree of substitution 1.26) retained 63 percent of its original strength on irradiation and (2) that untreated cotton yarn retained only 23 percent of its original strength on irradiation.

EXAMPLE 2

The method of Example 1, except that 5-methyl-2-furoyl chloride was used and except that concentrations in the reaction mixture of cotton to 5-methyl-2-furoyl chloride to pyridine were 1 mole of D-glucose residue of cotton to 3.3 moles of 5-methyl-2-furoyl chloride to 6.6 moles of pyridine. After 9 hours of reaction time, a 5- methyl-2-furoated cotton product with a degree of substitution of 1.22 5-methyl-2-furoate groups per glucose residue of cotton was obtained. The initial strength of this yarn product was 13.6 pounds; after exposure to radiation as in Example 1, the strength of the irradiated, yarn product was 9.6 pounds. Protection from radiation damage is indicated by the facts (1) that 5-methyl-2-furoated cotton yarn retained 71 percent of its original strength on irradiation and (2) that untreated cotton yarn retained only 23 percent of its original strength on irradiation.

EXAMPLE 3

The method of Example 1, except that 2-furanacryloyl chloride was used and except that concentrations in the reaction mixture of cotton to 2-furanacryloyl chloride to pyridine were 1 mole of D-glucose residue of cotton to 2.4 moles of 2-furanacryloyl chloride to 4.8 moles of pyridine. After 16 hours of reaction time, a 2-furanacryloylated cotton product with a degree of substitution of 0.65 2-furanacryloylate groups per glucose residue of cotton was obtained. The initial strength of this yarn product was 10.5 pounds; after exposure to radiation as in Example 1, the strength of the irradiated yarn product was 6.5 pounds. Protection from radiation damage is indicated by the facts (1) that the 2-furanacryloylated cotton yarn retained 62 percent of its original strength on irradiation and (2) that untreated cotton yarn retained only 21 percent of its original strength on irradiation.

EXAMPLE 4

The method of Example 1, except that 5-bromo-2-furoyl chloride was used and except that concentrations in the reaction mixture of cotton to 5-bromo-2-furoyl chloride to pyridine were 1 mole of D-glucose residue of cotton to 5 moles of 5-bromo-2-furoyl chloride to 10 moles of pyridine. After 6 hours of reaction time, a 5-bromo-2-furoated cotton product with an add-on (increase in weight) of 51 percent was obtained. The initial strength of this yarn product was 7.1 pounds; after exposure to radiation as in Example 1, the strength of the irradiated, yarn product was 5.1 pounds. Protection from radiation damage is indicated by the facts (1) that the 5-bromo-2-furoated cotton yarn retained 73 percent of its original strength on irradiation and (2) that untreated cotton yarn retained only 23 percent of its original strength on irradiation.

We claim:
1. A method of improving the degradation-resistance of cotton yarn upon exposure to high energy radiation comprising:
    (a) drying cotton yarn in air,
    (b) esterifying the dried cotton yarn with a furoyl chloride selected from the group consisting of 2-furoyl chloride, 5-methyl-2-furoyl chloride, 2-furanacryloyl chloride, and 5-bromo-2-furyl chloride,
    (c) washing the furoylated cotton yarn from (b) free of excess reagents,
    (d) restretching the washed, furoylated cotton yarn to approximately its initial length before reaction and drying the stretched, washed yarn.
2. The method of claim 1 wherein the furoyl chloride is 2-furoyl chloride.
3. The method of claim 1 wherein the furoyl chloride is 5-methyl-2-furoyl chloride.
4. The method of claim 1 wherein the furoyl chloride is 2-furanacryloyl chloride.
5. The method of claim 1 wherein the furoyl chloride is 5-bromo-2-furoyl chloride.
6. The product of claim 2.
7. The product of claim 3.
8. The product of claim 4.
9. The product of claim 5.

References Cited

UNITED STATES PATENTS 3,519,382   7/1970   Arthur et al. _____ 8—120

FOREIGN PATENTS 645,539   7/1962   Canada _____ 8—120

CHARLES E. VAN HORN, Primary Examiner

J. CANNON, Assistant Examiner

U.S. Cl. X.R.

38—144; 117—147, 93.3; 204—160.1; 260—210 R, 224